July 20, 1926.
W. BAUMGARTNER
BEE BOX VENTILATOR
Filed Jan. 2, 1926
1,593,008
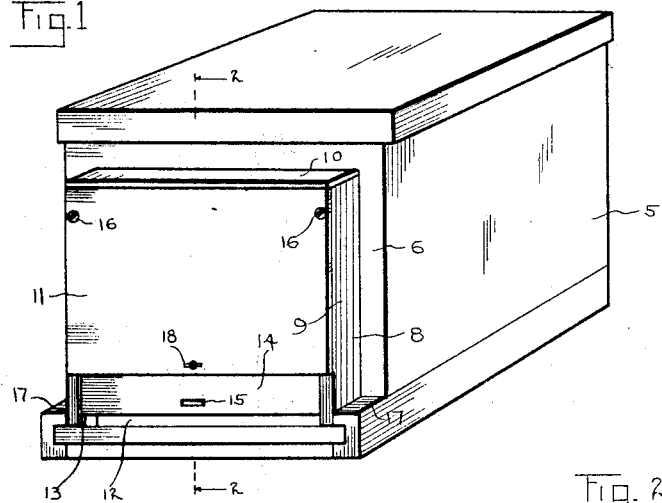
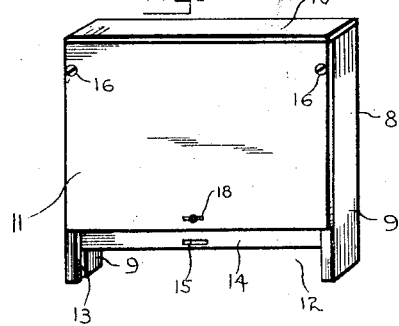
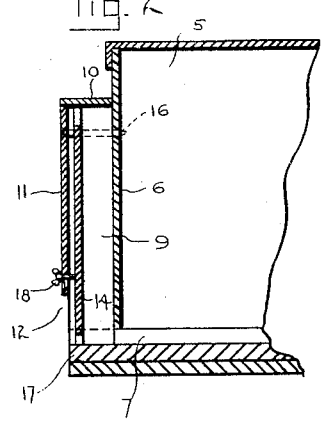
INVENTOR.
Werner Baumgartner
BY
Morrell, Keeney & Morrell
ATTORNEYS Patented July 20, 1926.

1,593,008

UNITED STATES PATENT OFFICE.

WERNER BAUMGARTNER, OF BROOKFIELD, WISCONSIN.

BEE-BOX VENTILATOR.

Application filed January 2, 1926. Serial No. 78,924.

This invention relates to improvements in bee box ventilators.

Bee boxes now in common use are provided with slots along the lower edge of the front to permit the entrance and exit of bees from the box and also for the purpose of ventilation. This form of opening is objectionable however, because it can not be regulated to suit the weather conditions and also is easily clogged by snow and ice in the winter in which case the bees within the box become suffocated.

It is, therefore, the primary object of the present invention to provide a ventilator and door for bee boxes which will overcome the above objections and may be mounted on a bee box of ordinary construction.

A further object of the invention is to provide a device of the class described which is adjustable to regulate the opening in the bee box and which in any adjusted position will allow the free entrance and exit of bees and efficiently ventilate the box.

A further object of the invention is to provide a bee box ventilator and adjustable door which can not become clogged by snow and ice in the winter.

A further object of the invention is to provide a bee box winter ventilator which will protect the bees and which is readily removable in summer.

A further object of the invention is to provide a device of the class described with which an ordinary form of bee box may be readily equipped without any alteration thereof.

A further object of the invention is to provide a bee box ventilator and door which will keep the warm air within the box.

A further object of the invention is to provide a bee box ventilator which is of very simple construction, is strong and durable, is inexpensive to manufacture, and is well adapted for the purposes described.

With the above and other objects in view the invention consists of the improved bee box ventilator and its parts and combinations, as set forth in the claims and all equivalents thereof.

In the accompanying drawing in which the same reference characters indicate the same parts in all of the views:

Fig. 1 is a perspective view of a bee box equipped with the improved ventilator;

Fig. 2 is a sectional view taken on line 2—2 of Fig. 1; and

Fig. 3 is a perspective view of the ventilator detached.

Referring now more particularly to the drawing it will appear that the numeral 5 indicates a bee box of ordinary construction such as is in common use. The box is entirely closed save at the front 6 which is spaced from the bottom of the box to provide a front opening or slot 7 through which the bees may pass in entering and leaving the box. Also the opening provides means for ventilating the interior of the box. This arrangement is satisfactory in summer and in mild weather but is open to objections in winter in that the opening is too large and exposes the bees to the elements and also the opening is easily blocked by snow.

The improved ventilator 8 overcomes the foregoing objections and is arranged for installation on a bee box, as shown in Fig. 1. The ventilator comprises a pair of vertical sides 9, a top 10, and a front 11. The front does not extend entirely to the bottom portions of the sides and provides a substantial opening or slot 12. The medial portions of the inner surfaces of the sides 9 are formed with vertical slots or grooves 13 within which is slidably mounted an adjustable door 14, the door being of less height than the height of the ventilator so as to provide a space above or below the same, or both. The bottom portion of the door is arranged with a finger notch 15 for manually raising and lowering the door.

The ventilator is secured to the front of a bee box 5 by means of screws 16 and the sides 9 of the ventilator rest against the inner faces of the bottom rails 17 of the box.

In summer and mild weather the door 14 may be raised as far as possible and held in adjusted position by means of a turn screw 18. With this arrangement the bees may pass through the opening 7 and below the door and front 11. Also the door may be readily adjusted to intermediate positions. In winter, however, the door is lowered to its lowermost position, completely closing direct passage from the opening 7. However, passage for air and the bees is still maintained through the opening 7, between the front of the box 6 and the door 14, between the top of the door and the top 10, between the door 14 and the front of the ventilator 11, and out through the space 12.

This arrangement provides for ample ventilation without a direct draft and also retains the warm air within the box as it rises and will not pass out through the downwardly extending passage.

From the foregoing description it will be seen that the improved bee box ventilator and door is of very simple and novel construction, and is well adapted for the purposes set forth.

What I claim as my invention is:

1. The combination with a bee box having a front lower opening, of an enclosure having a front wall arranged to provide an opening in coincidence with said first-mentioned opening, and a vertical slidable door of less height than the height of the enclosure between the box front and the front wall and arranged to open or close direct communication between said openings, there being a vertical space between the door and the box front, and a vertical space between the door and the front wall.

2. The combination with a bee box having a front lower opening, of an enclosure having a front wall arranged to provide an opening in coincidence with said first-mentioned opening, and an adjustable member spaced between the box front and the front wall and of a height to permit the provision of a space between it and the top or bottom of the enclosure.

In testimony whereof, I affix my signature.

WERNER BAUMGARTNER.